(12) United States Patent
Bergman (10) Patent No.: US 9,862,351 B2
(45) Date of Patent: Jan. 9, 2018

(54) BELT REEL FOR A VEHICLE SAFETY RESTRAINT ARRANGEMENT AND METHOD FOR LIMITING THE RETRACTION SPEED OF A BELT DURING RETRACTION ONTO A BELT REEL

(71) Applicant: VOLVO CAR CORPORATION, Gothenburg (SE)

(72) Inventor: Tomas Bergman, Gothenburg (SE)

(73) Assignee: VOLVO CAR CORPORATION (SE)

( * ) Notice: Subject to any disclaimer, the term of this patent is extended or adjusted under 35 U.S.C. 154(b) by 861 days.

(21) Appl. No.: 13/935,245

(22) Filed: Jul. 3, 2013

(65) Prior Publication Data

US 2014/0008478 A1    Jan. 9, 2014

(30) Foreign Application Priority Data

Jul. 6, 2012 (EP) .................................... 12175292

(51) Int. Cl.
*B60R 22/343* (2006.01)
*B60R 22/34* (2006.01)
*B60R 22/28* (2006.01)
*B60R 22/44* (2006.01)

(52) U.S. Cl.
CPC ............ *B60R 22/343* (2013.01); *B60R 22/34* (2013.01); *B60R 2022/284* (2013.01); *B60R 2022/4493* (2013.01)

(58) Field of Classification Search
USPC ....................................................... 242/381
See application file for complete search history.

(56) References Cited

U.S. PATENT DOCUMENTS

| 3,787,002 A | * | 1/1974 | Hayashi | ................. B60R 22/38 188/82.77 |
| 3,967,794 A | * | 7/1976 | Fohl | ..................... B60R 22/343 242/383.3 |
| 4,445,648 A | * | 5/1984 | Bloch | ..................... B60R 22/44 242/385 |
| 4,729,525 A | * | 3/1988 | Rumpf | ................. B60R 22/343 188/161 |

(Continued)

FOREIGN PATENT DOCUMENTS

| DE | 10322036 A1 | 12/2004 |
| DE | 102006037735 A1 | 2/2008 |

(Continued)

OTHER PUBLICATIONS

Extended European Search Report dated Dec. 4, 2012, Application No. EP 121752927-1523, Applicant Volvo Corporation, 4 Pages.

(Continued)

*Primary Examiner* — Sang Kim
(74) *Attorney, Agent, or Firm* — Brooks Kushman P.C.

(57) ABSTRACT

A vehicle safety restraint arrangement includes a retractable and extractable belt, a belt reel on which the belt is windable, a retraction mechanism adapted to retract the belt from an extracted position, and a belt retraction brake adapted to limit the retraction speed of the belt during retraction of the belt by imparting a braking force to the belt reel during retraction of the belt via inductance. The present disclosure also relates to a method for limiting the retraction speed of a belt arranged on a belt reel.

20 Claims, 5 Drawing Sheets

(56) References Cited

U.S. PATENT DOCUMENTS

| | | | | |
|---|---|---|---|---|
| 4,771,854 A * | 9/1988 | Syrowik | ................ | B60R 22/34 180/268 |
| 5,224,736 A * | 7/1993 | Sedlmayr | ............. | B60R 22/343 244/122 B |
| 5,441,304 A * | 8/1995 | Zygutis | ................ | B60R 22/343 180/268 |
| 6,257,363 B1 * | 7/2001 | Midorikawa | ........... | B60R 22/44 180/268 |
| 6,616,186 B1 * | 9/2003 | Midorikawa | ........... | B60R 21/01 280/735 |
| 6,650,982 B2 * | 11/2003 | Kopetzky | ........... | B60R 22/3413 180/268 |
| 6,676,060 B2 * | 1/2004 | Tanaka | ............... | B60R 22/3413 242/379.1 |
| 6,805,381 B2 * | 10/2004 | Smith, Jr. | ........... | B60R 22/3413 242/381 |
| 6,863,236 B2 * | 3/2005 | Kempf | ............... | B60R 22/3413 188/161 |
| 7,392,958 B2 * | 7/2008 | Holbein | ............... | B60R 22/343 242/374 |
| 9,217,487 B2 * | 12/2015 | Battlogg | ................ | B60R 22/28 |
| 2003/0102659 A1 * | 6/2003 | Frank | ...................... | B60R 22/46 280/806 |
| 2006/0091252 A1 | 5/2006 | Biller et al. | | |
| 2006/0226273 A1 * | 10/2006 | Prokscha | .............. | B60R 22/343 242/374 |
| 2007/0114318 A1 | 5/2007 | Thogersen et al. | | |
| 2007/0144811 A1 * | 6/2007 | Tanaka | ................... | B60R 22/44 180/268 |
| 2008/0231035 A1 * | 9/2008 | Breitschuh | .......... | B60R 22/3413 280/807 |
| 2009/0267339 A1 * | 10/2009 | Usoro | ................ | B60R 22/4676 280/807 |

FOREIGN PATENT DOCUMENTS

| | | |
|---|---|---|
| DE | 102008042020 A1 | 3/2010 |
| GB | 2265541 A | 10/1993 |
| GB | 2319502 A | 5/1998 |

OTHER PUBLICATIONS

Chinese First Search dated Jul. 18, 2016, Application No. 2013102807735, 1 page.

Chinese First Office Action dated Jul. 27, 2016, Application No. 2013102080773.5, 4 pages.

* cited by examiner

BELT REEL FOR A VEHICLE SAFETY RESTRAINT ARRANGEMENT AND METHOD FOR LIMITING THE RETRACTION SPEED OF A BELT DURING RETRACTION ONTO A BELT REEL

CROSS-REFERENCE TO RELATED APPLICATIONS

This application claims foreign priority benefits under 35 U.S.C. §119(a)-(d) to European patent application number EP 12175292.7, filed Jul. 6, 2012, which is incorporated by reference in its entirety.

TECHNICAL FIELD

The present disclosure relates to a belt reel for a vehicle safety restraint arrangement, the belt reel is adapted to retract the belt from an extracted position using a retraction mechanism. The belt reel comprises a belt retraction brake adapted to limit the retraction speed during retraction of the belt. The present disclosure also relates to a method for limiting the retraction speed of a belt reel during retraction of a belt onto the belt reel.

BACKGROUND

Seat belts, sometimes referred to as safety belts, in vehicles have significantly reduced the probability of injuries during collisions or other incidents. The belt itself is generally wounded up about a reel, generally referred to as a belt reel. A belt reel of conventional type comprises a retraction mechanism to retract the belt from an extracted position. One extracted position is a buckled position, e.g., the position a driver of the vehicle has when being position behind the steering wheel and buckled up.

When the belt reel retracts the belt, the belt with its buckle runs the risk of either being retracted too slow or too fast. If retracted too slow, the belt can be caught between the vehicle body and its door which might damage the belt. If the buckle is caught between the door and the vehicle body, the buckle could break or damage the lacquer of the vehicle body. Should the belt reel retract the belt too fast, the buckle runs the risk of smashing into the interior panels of the vehicle and damage the interior panel. It has been noticed that a belt retraction speed approximately >3.0 m/s can damage the interior panels of the vehicle if hit by the buckle. Even if the impact of the buckle on the interior panel does not destroy the interior panel, it leaves ugly marks which can reduce the value of the vehicle. Providing a controlled belt retraction is thus a problem which needs to be addressed.

In the published UK Patent Application No. GB 2,319,502 A, a retractor assembly is disclosed. The retractor assembly comprises a two curved brake shoes arranged at a distance. The belt travels between the two brake shoes during the extracting and retracting motion. The curved brake shoes comprise inductive material such that when current is passed through them they are attracted to each other imparting a brake force to the belt webbing. The rotatable spool, or belt reel, itself can also be provided with an eddy current brake to restrict the pay out of the belt during a crash or collision. The document is however silent as to how the belt can be retracted in a safe and secure manner without risking inflicting damages to the interior panel or the lacquer of the vehicle.

SUMMARY

It is an object of the present disclosure to at least partly solve the above mentioned drawbacks, at least provide for an improvement, or at least provide for a useful alternative to existing solutions. The objective is at least partly met by a belt reel for a vehicle safety restraint arrangement. The belt reel comprises a retractable and extractable belt, a retraction mechanism adapted to retract the belt from an extracted position, and a belt retraction brake adapted to limit the retraction speed of the belt by imparting a braking force to the belt reel during retraction of the belt. The braking force of the belt retraction brake is imparted to the belt reel via inductance.

The belt reel can be configured to have a retraction mechanism which can be adapted to retract the belt using a higher load than what would otherwise be suitable as during the retraction of the belt, the retraction speed of the belt can thus be kept from peaking. If the retraction mechanism is a pre tensioned biasing member, such as a pre tensioned spring, the belt retraction brake also compensates for tolerances of the pre tensioned spring of the belt reel.

Furthermore, by using a retraction mechanism which retracts the belt using a higher load than what would otherwise be suitable, the risk of pinching the belt and possibly a belt buckle between a vehicle body and a door is reduced.

The belt retraction brake can be passive, passive in terms of that it requires no electricity to operate, i.e., no power source. Permanent magnets are advantageously used when the belt retraction brake is passive. In another embodiment it is conceivable that a power source is connected together with an electronic control unit (ECU), to better control the retraction brake properties of the belt reel.

According to an aspect, belt retraction brake comprises a coil portion adapted to cooperate with the belt reel, and at least one magnet arranged on the belt reel. The inductance is thus imparted during the retraction of the belt and as the belt reel rotates. A permanent magnet is advantageously used.

According to an aspect, the coil portion of the belt retraction brake comprises an inductor or coil, or optionally a copper cylinder.

According to an aspect, the belt reel can comprise a first end and a second end and a belt portion arranged between the first and the second ends of the belt reel. The belt can thus be wound up about the belt portion, at least after retraction of the belt. At least one end of the belt reel is adapted to form a part of the belt retraction brake, optionally both the first end and the second end of the belt reel are adapted to form a part of the belt retraction brake.

The first end and/or the second end of the belt reel can have different shapes and forms. For example, the first end and/or the second end of the belt reel can be; symmetric or non symmetric; have a polygonal form such as triangular (or trigon), quadrilateral (or quadrangle or tetragon), pentagon, hexagon, heptagon, octagon, enneagon or nonagon, decagon. It should be noted that from decagon and above, the periphery can be considered more or less circular. Advantageously, the first end and the second end comprise a substantially circular periphery, optionally a true circular periphery. It is possible that at least one end of the first end and the second end of the belt reel comprises a non circular periphery.

The coil, or copper cylinder, can be arranged in the proximity of the first end and/or the second end of the belt reel.

According to an aspect, at least one magnet is arranged on the first end and/or second end of the belt reel. The magnet can be a permanent magnet. At least 1, 2, 3, 4, 5, 6, 7, 8, 9, 10 or more magnets can be arranged on the first end and/or second end of the belt reel. A suitable number of magnets are between 6-20 magnets. The at least one magnet is advantageously arranged about the periphery of the first end and/or second end of the belt reel.

According to an aspect, the braking power of the belt retraction brake is about 1-30 Watts (W).

According to an aspect, the belt retraction brake comprises a disc shaped element, such as a copper disc, aluminum disc, or a disc a conductive material, and at least one permanent magnet. The disc shaped element can be arranged on the belt reel, and preferably on the first end and/or second end of the belt reel. The at least one permanent magnet can be arranged on a fixed position with respect to the disc shaped element, such as a belt reel housing.

According to an aspect, the retraction mechanism is adapted to impart a retraction force to the belt reel. The retraction force is rotating the belt reel so that the belt is retracted from an extracted position. The retraction force imparted to the belt reel by the retraction mechanism is larger than the braking force imparted to the belt reel via the belt retraction brake.

According to a second aspect, the present disclosure also relates to a method for limiting the retraction speed of a belt arranged on a belt reel. The belt reel is adapted for a vehicle safety restraint arrangement, the method comprising the steps of;

retracting the belt onto a belt reel using a retraction mechanism;

limiting the maximum speed during the retraction by imparting a braking force to the belt reel using induction.

The belt reel can be a belt reel according to any of the appended claims.

The present disclosure relates to a belt reel for a vehicle safety restraint arrangement. The belt reel comprises a retractable and extractable belt, a retraction mechanism adapted to retract the belt from an extracted position, and a belt retraction brake adapted to limit the retraction speed of the belt by imparting a braking force to the belt reel during retraction of the belt. The braking force of the belt retraction brake is imparted to the belt reel via inductance. The present disclosure also relates to a method for limiting the retraction speed arranged on a belt reel. The present disclosure provides for a belt reel which reduces the risk for damage to the interior panel, lacquer or the vehicle body and/or door, and the belt itself.

BRIEF DESCRIPTION OF THE DRAWINGS

Non limiting embodiment of the present disclosure will be described in greater details with reference to the following figures in which.

DETAILED DESCRIPTION

Figure 1:
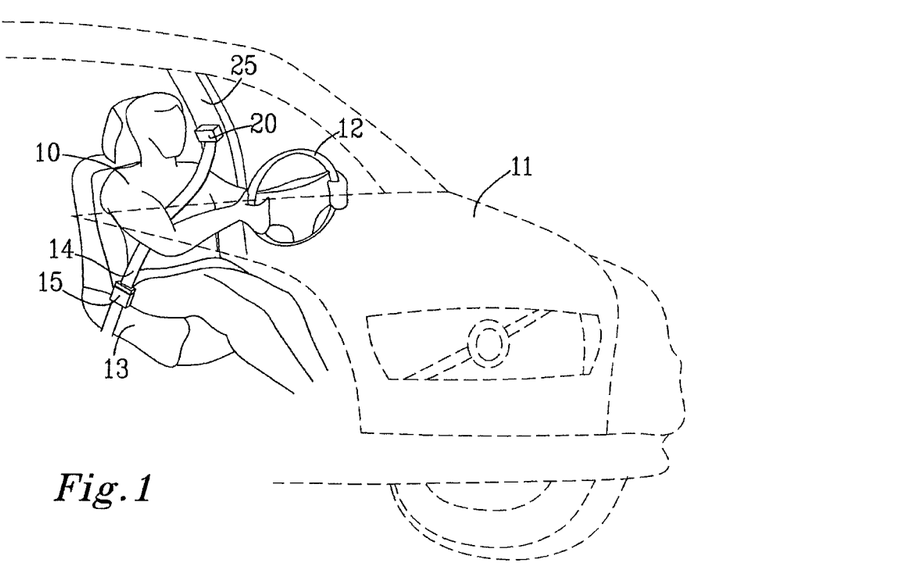
FIG. 1 shows a driver of a car, the driver being buckled up using a belt, buckle and a belt reel according to an embodiment of the present disclosure.

FIG. 1 shows a driver 10 of a vehicle 11, in this case a car; the driver is positioned on the driver side of the vehicle in front of the steering wheel 12 on a driver seat 13. To prevent the driver 10 from being injured in case of e.g., a collision, the driver 10 is buckled using a belt 14 comprising a buckle 15. The belt 14 extends from a belt reel 20 according to an embodiment of the present disclosure, the belt reel being positioned on a pillar 25 of the vehicle. The pillar 25 is also referred to as the A-pillar 25 of the vehicle 11. It should be noted that the belt reel 20 can be positioned in other positions in the vehicle 11. The belt reel 20 forms a vehicle safety restraint arrangement together with the belt 14 and the buckle 15 after being assembled to the vehicle 11.

Figure 2:
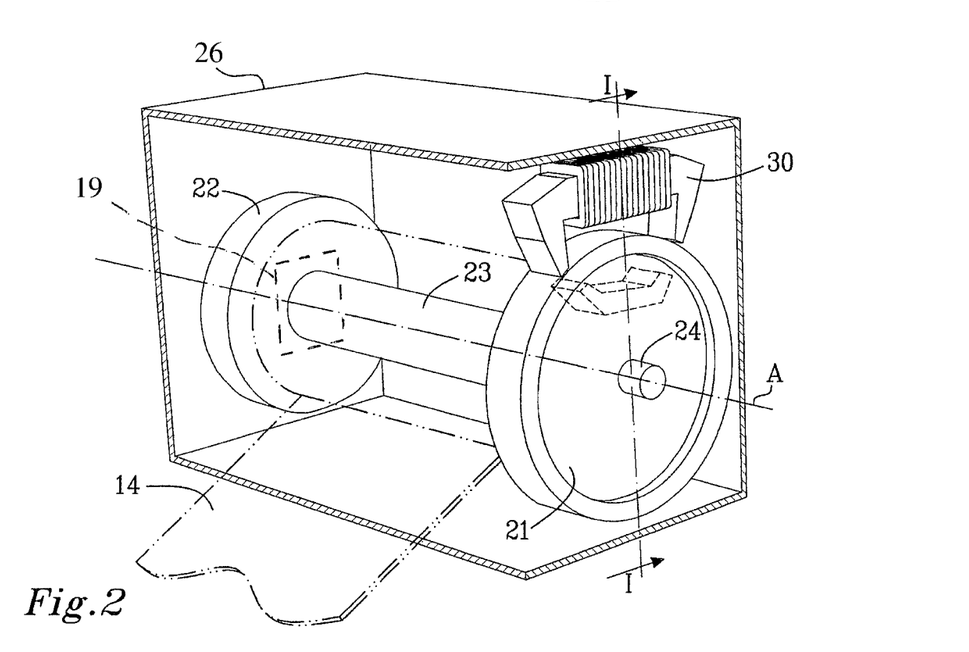
FIG. 2 shows the belt reel of FIG. 1 in greater detail.

Non limiting embodiments of the belt reel 20 will hereafter be described in greater detail. FIG. 2 shows an embodiment of the belt reel 20 comprising a belt 14 wound up about the belt reel 20. The belt 14 is transparently illustrated using dashed lines to better show the belt reel 20. The belt reel 20 permits the belt 14 to be extracted and retracted, e.g., to fasten a driver as shown in FIG. 1. The belt reel 20 comprises a retraction mechanism in the form of a spring 19 (shown schematically in FIG. 1) which is loaded as the belt 14 is retracted. If a user, such as a driver, buckles up, the spring is loaded so as to retract the belt 14 after being unbuckled back to a position which generally is in the proximity of the belt reel 20. The belt reel 20 rotates about an axis of rotation A during the extraction or retraction of the belt 14. The belt reel 20 comprises first and second ends 21, 22 and a belt section 23 extending between the first and second ends 21, 22. The belt section 23 is that part of the belt reel 20 about which the belt 14 is wound up about. A shaft 24 extends from the first end and the second end 21, 22 of the belt reel 20. Further shown in FIG. 2 is a housing 26, adapted to enclose the belt reel 20, while permitting the belt 14 to extend through a slot or opening (not shown in FIG. 2). For the sake of illustrating the belt reel 20, the housing 26 is shown with portions partly transparent. The shafts 24 are rotationally attached to the housing 26, which in turn is attached to the vehicle 11, in FIG. 1 in the proximity of the A-pillar 25 of the vehicle 11.

The belt reel 20 comprises a retraction mechanism, retraction means, to retract the belt 14 from an extracted position, e.g., when a driver unbuckles the belt 14 from the position shown in FIG. 1. The retraction mechanism can be a spring which is pre tensioned, and loaded during the extraction of the belt 14 from the belt reel 20. Other biasing members are possible, such as elastic polymer material, or an electric motor, or the like. The retraction mechanism can be configured to impart a torque to the belt reel of from 0.10-0.50 Nm, advantageously 0.10-0.3 Nm, preferably 0.12-0.25 Nm.

Arranged at the first end 21 of the belt reel 20 is a belt retraction brake 30. It should be noted that the belt reel 20 can be arranged with one or more belt retraction brakes, e.g., two belt retraction brakes as shown in FIG. 2, however only one belt retraction brake 30 will be described herein. The retraction mechanism is adapted to impart a retraction force to the belt reel, however the retraction force imparted to the belt reel by the retraction mechanism is larger than the braking force imparted to the belt reel via the belt retraction brake.

Figure 3:
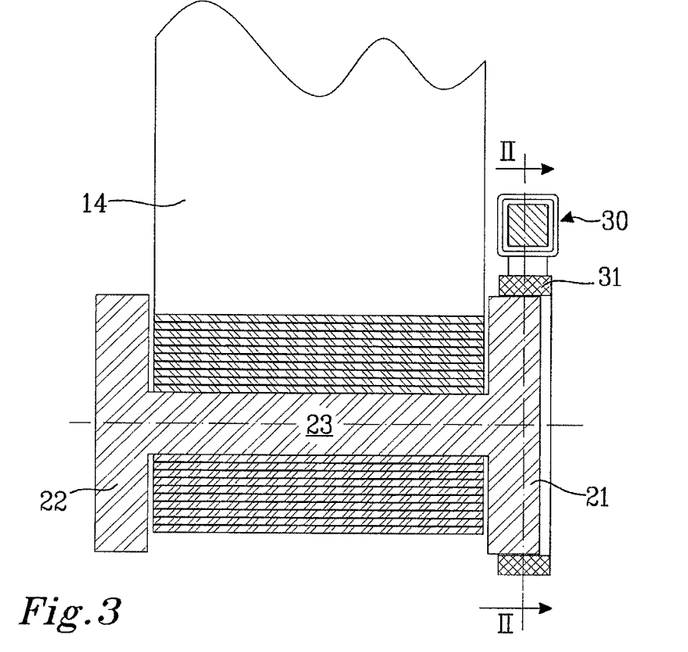
FIG. 3 shows the belt reel of FIG. 2 in a cross section.

FIG. 3 shows a cross section of the belt reel 20 shown in FIG. 2 along the line I-I, the first and the second ends 21, 22, the belt section 23, and the belt 14. The belt retraction brake 30 is arranged at the first end 21 of the belt reel 20, and arranged to be in working cooperation with the first end 21 of the belt reel 20. The belt retraction brake 30 is adapted to limit the speed of the belt 14 during retraction by reducing the angular velocity of the belt reel 20 during rotation, at least during the rotation which retracts the belt 14 back onto the belt reel 20.

Figure 4:
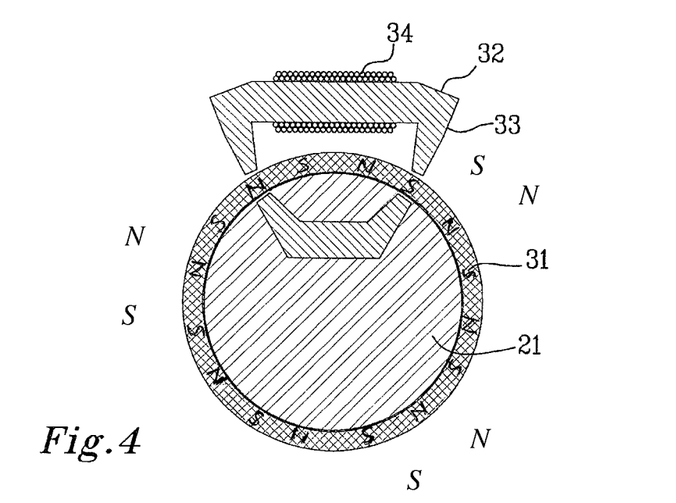
FIG. 4 shows the belt reel of FIG. 3 in a cross section.

FIG. 4 shows a cross section of the belt reel 20 shown in FIG. 3 and along the line II-II. FIG. 4 shows the belt retraction brake 30 comprising a magnet portion 31, in the embodiment comprising a plurality of poles indicated by N, for the north pole, and S, for the south pole. The magnet portion 31 can be formed by a plurality of magnets. An inductor or coil 32 comprising an iron core 33 and a copper wire 34 wrapped about a portion of the iron core 33 provides for the conductor. As the belt reel 20 rotates, eddy currents will be formed in the inductor 32 generating an electromagnetic force which imparts a braking force to the belt reel 20, which in turn will limit the retraction speed of the belt 14 during belt retraction.

Some parameters which can be manipulated to increase the braking force imparted to the belt reel 20 are:
- Use stronger magnets—increases remanence T.
- Change fields faster (rotate the belt reel 20 faster)—increases the frequency.
- Use thicker materials of the conductive material, care have to be taken not to use too thick material as the distance between the magnets may be too far.
- Lower resistivity materials—decreases ρ.

Using a belt retraction brake 30 during the retraction of the belt 14 is very advantageous, in practice; if the angular velocity of the belt reel 20 is increased the braking force of the belt retraction brake 30 will be significantly improved.

Figure 5:
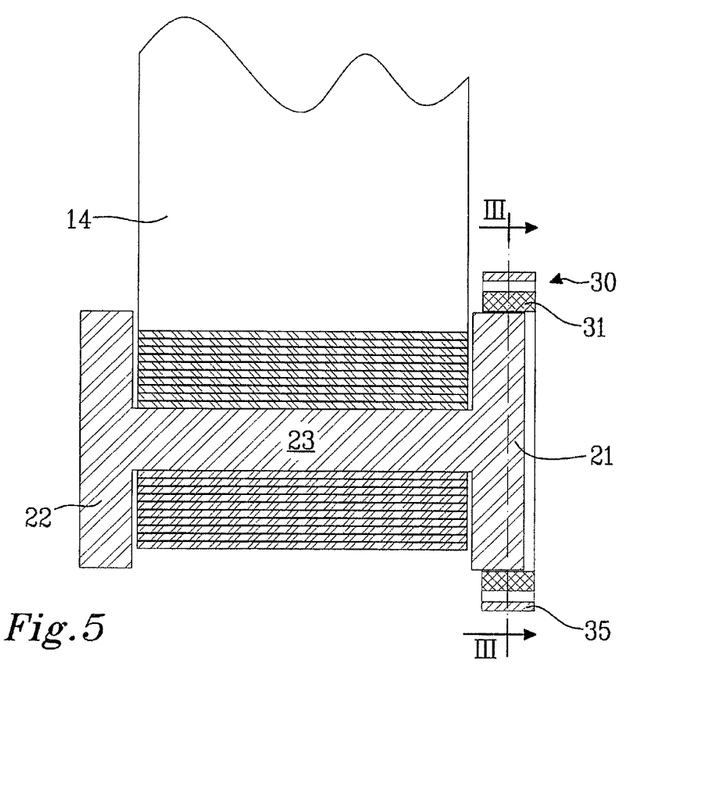
FIG. 5 shows a belt reel according to the present disclosure in a cross section having an alternative belt retraction brake.
Figure 6:
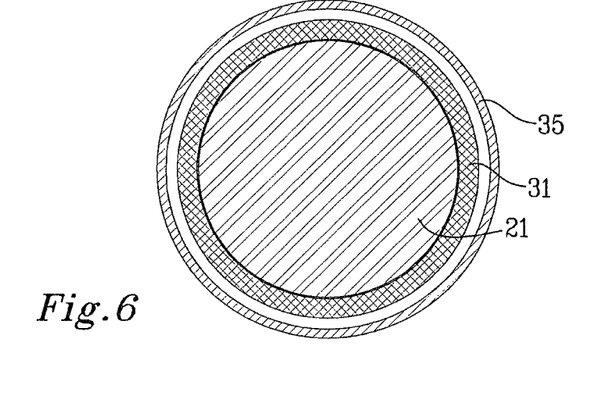
FIG. 6 shows the belt reel of FIG. 5 in a cross section.

FIG. 5 shows another embodiment of a belt reel 20. FIG. 6 shows a cross section of the belt reel 20 shown in FIG. 5 along the line III-III. With reference to FIGS. 5 and 6, the belt reel 20 comprises a belt 14, first and second ends 21, 22 with a belt section 23 arranged therebetween. At the first end 21 of the belt reel 20 is arranged an alternative belt retraction brake 30. The belt retraction brake 30 comprises in this case a circular copper ring 35 arranged about a magnet portion 31, in the form of a plurality of magnets, to create the braking force imparted to the belt reel 20, instead of a coil as described above.

Figure 7:
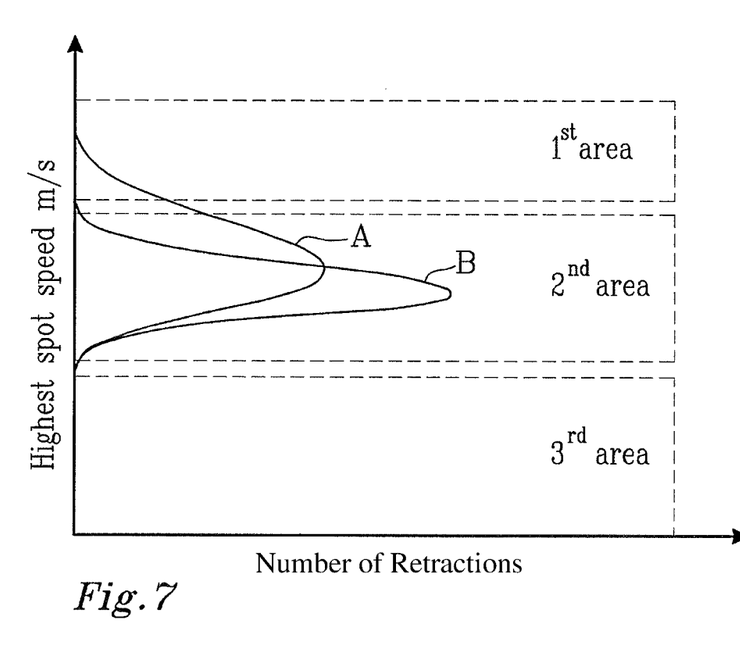
FIG. 7 shows a diagram of a the highest spot speed vs. number for; a belt reel without induction brake and; a belt reel comprising induction brake and a strengthened retraction mechanism in the form of a strengthened spring.

FIG. 7 shows a diagram comprising first and second graphs A, B which represent the relation between the belt retraction brake 30 of the belt reel 20, described above using non limiting embodiments, and different types of damages which may occur during as a consequence of the retraction speed of the belt reel. The belt reel being positioned in a car as seen in FIG. 1. The first axis is the highest spot speed (m/s) (highest speed at a point in time) and the second axis is the number of retractions (dimensionless).

The diagram of FIG. 7 is further partitioned in three areas:
- the first area represents damage to pillars and doors, and primarily the A-pillar of the car;
- the second area represents a state at which no damage occurs, i.e., the belt is retracted without any damages or negative consequences; and
- the third area represents damage to the belt web, buckle, door seal, or the lacquer in the door area of the car.

The first graph A shows the normal distribution for a normal belt reel having a standardized retraction mechanism. As can be seen in FIG. 7, using a normal belt reel without a belt retraction brake, a percentage of the retractions inflict damage to the pillars or side panels of the car. Another percentage can inflict damage to the belt web, or door seal, due to being retracted to slow, i.e., the retraction mechanism is too weak.

The damages mentioned above can be costly and renders ugly and unaesthetic marks on the interior of the car, or on the belt or its buckle. There is also a risk that the belt itself, sometimes referred to as the belt web, can be damaged, which can have dramatic consequences during a collision.

Using a belt reel comprising a belt retraction brake, according to embodiments of the present disclosure, the normal distribution can be better fitted to the safe zone, i.e., the second area shown in FIG. 7. The belt retraction brake permits the retraction mechanism to be stronger than what is otherwise suitable, while at the same time prevent the belt from acquiring an excessive speed during the retraction of the belt.

It has been noticed that as the belt reaches a retraction speed of more than >3.0 m/s, the buckle 15 of the belt 14 can damage the interior panels of the car. The magnet portion 31 should thus be selected so that the retraction speed of the buckle is kept below 3.0 m/s, or preferably below 2.5 m/s. Optionally, as mentioned above, other parameters can be varied to limit the retraction speed.

Suitable force of the magnets used in the magnet portion 31 are; 0.5-3 T, preferably about 0.75-2 T.

Figure 8A:
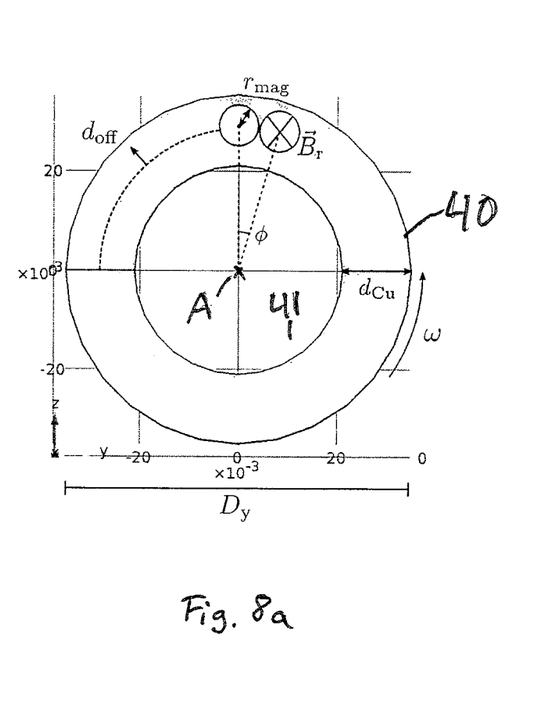
FIGS. 8a-8b show a schematic embodiment of a belt retraction brake in two different views.
Figure 8B:
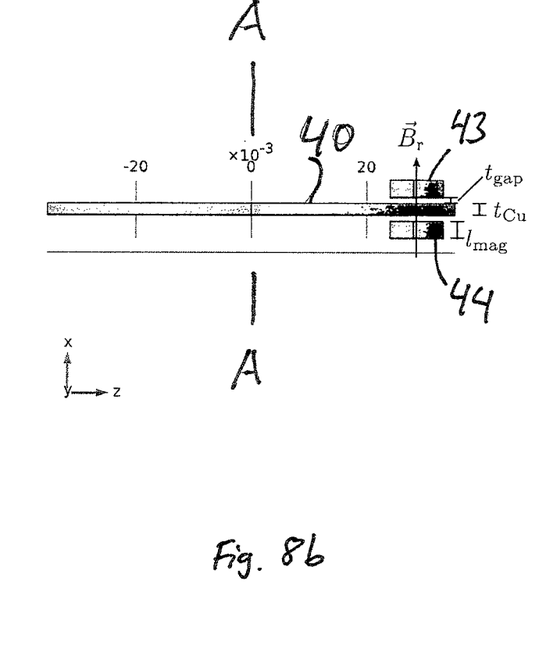

FIGS. 8a-8b show a schematic embodiment of a magnetic brake which can be used for the purpose of the disclosure. FIG. 8a-8b show a disc shaped element in the form of a copper disc 40 with an aperture 41. The copper disc 40 is connected to the belt reel 20 and has the same axis of rotation A, as shown in FIG. 2, and rotates with the rotation vector $\vec{\omega} = \omega$ about the axis A. Total diameter is $D_y$. On each of the opposite sides of the copper disc are two button shaped permanent magnets 43, 44 arranged, totally four permanent magnets, with a radii of rmag a height of $I_{mag}$ and with a distance of $t_{gap}$ away from the copper disc 40. The permanent magnets are arranged as close together as possible, which determines the angle Φ in FIG. 8a. The permanent magnets 43, 44 have been magnetized with a remanence Br. A couple of the permanent magnets have a unidirected remanence, so that there are magnetic fields parallel with the rotation axis A of the copper disc 40.

The following references and values are used with respect to FIGS. 8a-8b.

| | | |
|---|---|---|
| $d_y$ | total diameter | 70 mm |
| $d_{cu}$ | width of copper disc | 14 mm |
| $t_{cu}$ | thickness of copper disc | 2 mm |
| $\sigma_{cu}$ | conductivity of copper disc | $5.998 * 10^7$ S/m |
| $t_{gap}$ | air gap | 1 mm |
| $r_{mag}$ | radii of permanent magnet | 4 mm |
| $l_{mag}$ | height of permanent magnet | 3 mm |
| $d_{off}$ | position radially of permanent magnet | 1 mm |
| φ | angular distance between the permanent magnets | As small as possible |
| Br | remanence of the permanent magnets | 1 T |
| $n_{mag}$ | Number of magnets (on each side) | 2 |

Metals other than copper could be used for the copper disc 40, such as aluminum for example. The thickness $t_{cu}$ of the copper disc can be between 0.5-5 mm, preferably 2.0-3.5 mm. The position radially of permanent magnet $d_{off}$ can be −1 to 3 mm, preferably 0.5-1.5 mm. The angular distance between the permanent magnets Φ can be 5-25 degrees, but as close as possible is advantageous. Preferably the magnets are positioned adjacent each other. The radii of permanent magnet $r_{mag}$ can be between 2-15 mm, 2-8 mm or advantageously 3-6 mm. The height of permanent magnet $I_{mag}$ can be 0.5-10 mm, 2-8 mm, advantageously 3-6 mm. Optionally the number of magnets on each side can be 1, 2, 4, 6, 8, 10 or more, preferably 2-10 magnets on each side.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle safety restraint arrangement comprising:
   a retractable and extractable belt;
   a belt reel on which the belt is windable;
   a retraction mechanism adapted to retract the belt from an extracted position; and
   a belt retraction brake adapted to limit the retraction speed of the belt by imparting a braking force to the belt reel during retraction of the belt, the braking force of the belt retraction brake being impartable to the belt reel via inductance so that the braking force is not applied via friction between the belt retraction brake and the belt reel.

2. The arrangement according to claim 1 wherein the belt retraction brake comprises a coil portion adapted to cooperate with the belt reel, and at least one magnet arranged on the belt reel.

3. The arrangement according to claim 2 wherein the coil portion of the belt retraction brake comprises an inductor.

4. The arrangement according to claim 1 wherein the belt retraction brake comprises a copper cylinder.

5. The arrangement according to claim 1 wherein the belt retraction brake comprises a disc shaped element, and at least one permanent magnet.

6. The arrangement according to claim 5 wherein the disc shaped element comprises a copper disc.

7. The arrangement according to claim 5 wherein the disc shaped element is arranged on the belt reel.

8. The arrangement according to claim 1 wherein the belt reel comprises first and second ends, and a belt portion arranged between the first and second ends, the belt being windable about the belt portion.

9. The arrangement according to claim 8 wherein the first end and/or the second end comprises a substantially circular periphery.

10. The arrangement according to claim 8 wherein the belt retraction brake comprises at least one magnet arranged on the first end and/or the second end of the belt reel.

11. The arrangement according to claim 10 wherein the at least one magnet is arranged about a substantially circular periphery of the first end and/or the second end of the belt reel.

12. The arrangement according to claim 1 wherein the belt retraction brake is a passive belt retraction brake, such that the belt retraction brake requires no electricity to operate.

13. The arrangement according to claim 1 wherein the retraction mechanism is adapted to impart a retraction force to the belt reel that is larger than the braking force imparted to the belt reel via the belt retraction brake.

14. The arrangement according to claim 1 wherein the belt retraction brake comprises a circular magnet portion attached to the belt reel and including a plurality of poles.

15. The arrangement according to claim 14 wherein the belt reel is rotatable about an axis, and the belt retraction brake comprises an inductor having two legs positioned adjacent the magnet portion such that the two legs are aligned with each other in a direction perpendicular to the axis.

16. The arrangement according to claim 15 wherein the inductor comprises a core and a wire wrapped around a portion of the core between the two legs.

17. The arrangement according to claim 15 wherein the inductor is positioned outside of an outer periphery of the belt reel and an outer periphery of the magnet portion, such that the inductor does not extend inwardly of the outer periphery of the magnet portion.

18. The arrangement according to claim 1 wherein the belt retraction brake comprises a magnet portion attached to the belt reel at one end of the belt reel and including a plurality of poles, and an inductor positioned outside of an outer periphery of the one end of the belt reel and having two legs that extend toward the one end of the belt reel.

19. A vehicle safety restraint arrangement comprising:
   a retractable and extractable belt;
   a belt reel on which the belt is windable;
   a retraction mechanism adapted to retract the belt from an extracted position; and
   a belt retraction brake adapted to limit the retraction speed of the belt by imparting a braking force to the belt reel during retraction of the belt, the braking force of the belt retraction brake being impartable to the belt reel via inductance, wherein the belt retraction brake is a passive belt retraction brake, such that the belt retraction brake requires no voltage source to operate.

20. A vehicle safety restraint arrangement comprising:
   a retractable and extractable belt;
   a belt reel on which the belt is windable;
   a retraction mechanism adapted to retract the belt from an extracted position; and
   a belt retraction brake adapted to limit the retraction speed of the belt by imparting a braking force to the belt reel during retraction of the belt, the braking force of the belt retraction brake being impartable to the belt reel via inductance, the belt retraction brake comprises a magnet portion attached to the belt reel at one end of the belt reel and including a plurality of poles, and an inductor positioned outside of an outer periphery of the one end of the belt reel and having two legs that extend toward the one end of the belt reel.

* * * * *